(12) United States Patent
Actis Goretta et al.

(10) Patent No.: US 12,440,531 B2
(45) Date of Patent: Oct. 14, 2025

(54) COMPOSITION FOR USE IN IMPROVING ENDOTHELIAL FUNCTION BY ENHANCING FLOW MEDIATED DILATION

(71) Applicant: SOCIETE DES PRODUITS NESTLE S.A., Vevey (CH)

(72) Inventors: Lucas Actis Goretta, Singapore (SG); Rachid Bel-Rhlid, Savigny (CH)

(73) Assignee: Societe des Produits Nestle S.A., Vevey (CH)

( * ) Notice: Subject to any disclaimer, the term of this patent is extended or adjusted under 35 U.S.C. 154(b) by 871 days.

(21) Appl. No.: 17/602,052

(22) PCT Filed: Apr. 8, 2020

(86) PCT No.: PCT/EP2020/060092
§ 371 (c)(1),
(2) Date: Oct. 7, 2021

(87) PCT Pub. No.: WO2020/208108
PCT Pub. Date: Oct. 15, 2020

(65) Prior Publication Data
US 2022/0193172 A1    Jun. 23, 2022

(30) Foreign Application Priority Data
Apr. 10, 2019  (EP) .................................. 19168455

(51) Int. Cl.
| | | |
|---|---|---|
| A61K 36/74 | (2006.01) | |
| A23L 33/105 | (2016.01) | |
| A61P 3/10 | (2006.01) | |
| A61P 9/08 | (2006.01) | |

(52) U.S. Cl.
CPC .......... *A61K 36/74* (2013.01); *A23L 33/105* (2016.08); *A61P 3/10* (2018.01); *A61K 2236/10* (2013.01); *A61K 2236/51* (2013.01)

(58) Field of Classification Search
None
See application file for complete search history.

(56) References Cited

U.S. PATENT DOCUMENTS

| | | | | |
|---|---|---|---|---|
| 8,481,028 | B2 * | 7/2013 | Bel-Rhlid | A61K 35/66 424/94.1 |
| 2010/0112098 | A1 * | 5/2010 | Lemaire | A61K 31/235 514/533 |
| 2011/0045106 | A1 * | 2/2011 | Bel-Rhlid | A61P 3/10 424/725 |
| 2016/0081967 | A1 * | 3/2016 | Prasad | A61P 3/04 514/533 |
| 2017/0007658 | A1 * | 1/2017 | Uppal | A61K 36/74 |

FOREIGN PATENT DOCUMENTS

| | | |
|---|---|---|
| JP | 2011520429 A | 7/2011 |
| WO | 2009132887 | 11/2009 |

OTHER PUBLICATIONS

Cespedes, Andrea, "Recommended Calorie Intake for One Meal", 2017, Livestrong.com, pp. 1-4 (Year: 2017).*
Buscemi, S., et al. "Coffee and endothelial function: a battle between caffeine and antioxidants?" European journal of clinical nutrition 64.10 (2010): 1242-1243. (Year: 2010).*
Flanagan, John, et al. "Lipolytic activity of Svetol®, a decaffeinated green coffee bean extract." Phytotherapy research 28.6 (2014): 946-948. (Year: 2014).*
Mills et al. "Mediation of coffee-induced improvements in human vascular function by chlorogenic acids and its metabolites: Two randomized, controlled, crossover intervention trials" Clinical Nutrition, 2017, vol. 36, pp. 1520-1529.
Bhandarkar et al. "Green coffee ameliorates components of diet-induced metabolic syndrome" Journal of Functional Foods, 2019, vol. 57, pp. 141-149.
Tajik et al. "The potential effects of chlorogenic acid, the main phenolic components in coffee, on heath: a comprehensive review of the literature" Eur J Nutr, 2017, vol. 56, pp. 2215-2244.
Suzuki et al., "Chlorogenic Acid-Enriched Green Coffee Bean Extract Affects Arterial Stiffness Assessed by the Cardio-Ankle Vascular Index in Healthy Men: A Pilot Study", International Journal of Food Sciences and Nutrition, vol. 70, Issue No. 7, 2019, pp. 901-908.
Notice of Allowance Received for Application No. JP2021-558754, mailed on Aug. 6, 2024, 5 Pages (2 Pages of English Translation and 3 Pages of Official Copy).

* cited by examiner

*Primary Examiner* — Bethany P Barham
*Assistant Examiner* — Peter Anthopolos
(74) *Attorney, Agent, or Firm* — K&L Gates LLP

(57) ABSTRACT

The present invention relates to a composition comprising esterase treated decaffeinated green coffee extract (HDGCE) for use in a method of improving cardiovascular endpoints such as endothelial function by enhancing flow mediated dilation in a subject, wherein the subject is administered an effective dose of HDGCE with an amount of 100-400 mg/day.

12 Claims, 6 Drawing Sheets
Specification includes a Sequence Listing.

SEQUENCE LISTING

<160> NUMBER OF SEQ ID NOS: 2

<210> SEQ ID NO 1
<211> LENGTH: 747
<212> TYPE: DNA
<213> ORGANISM: Lactobacillus johnsonii
<220> FEATURE:
<223> OTHER INFORMATION: esterase from Lactobacillus johnsonii (NCC 533)

<400> SEQUENCE: 1

```
atggagacta caattaaacg tgatggtcta aacttacatg gtttacttga aggaaccgat      60
aagattgaaa atgatacgat tgctatttta atgcatggtt ttaaaggtga tttgggttat     120
gatgacagca agattttgta tgctctctct cactacttaa atgatcaagg cctcccaaca     180
attcgttttg actttgatgg atgcggaaaa agtgatggta aatttgaaga tatgactgtc     240
tatagcgaaa tcctagatgg gataaaaata ttagattatg ttcgtaatac tgttaaggca     300
aaacatatct atttagtggg acactcccaa ggtggagtag tagcgtcaat gctggctgga     360
tattatcgag atgttattga aaaattggct ttactctctc ctgcagcaac tcttaagtct     420
gatgctttag atggagtttg tcagggtagt acttatgatc aacgcatat ccctgaaact     480 gtcaatgtta gtggctttga agtaggagga gcttacttta gaacggctca attattgcct     540
atttatcaaa cagcggaaca ttataatagg gaaactttat tgattcatgg cttagcagat     600
aaagtcgtgt cacctaatgc ttcaagaaaa tttcatacac ttttgcctaa aagtgagctc     660
catttaattc cagatgaggg tcacatgttt aacggaaaaa atagacctga agtattaaaa     720
ttagttggtg agttttaat aaaataa                                          747
```

<210> SEQ ID NO 2
<211> LENGTH: 248
<212> TYPE: PRT
<213> ORGANISM: Lactobacillus johnsonii
<220> FEATURE:
<223> OTHER INFORMATION: esterase from Lactobacillus johnsonii (NCC 533)

```
<400> SEQUENCE: 2

Met Glu Thr Thr Ile Lys Arg Asp Gly Leu Asn Leu His Gly Leu Leu
1               5                   10                  15

Glu Gly Thr Asp Lys Ile Glu Asn Asp Thr Ile Ala Ile Leu Met His
            20                  25                  30

Gly Phe Lys Gly Asp Leu Asp Tyr Asp Asp Ser Lys Ile Leu Tyr Ala
        35                  40                  45

Leu Ser His Tyr Leu Asn Asp Gln Gly Leu Pro Thr Ile Arg Phe Asp
    50                  55                  60

Phe Asp Gly Cys Gly Lys Ser Asp Gly Lys Phe Glu Asp Met Thr Val
65                  70                  75                  80

Tyr Ser Glu Ile Leu Asp Gly Ile Lys Ile Leu Asp Tyr Val Arg Asn
                85                  90                  95

Thr Val Lys Ala Lys His Ile Tyr Leu Val Gly His Ser Gln Gly Gly
                100                 105                 110

Val Val Ala Ser Met Leu Ala Gly Tyr Tyr Arg Asp Val Ile Glu Lys
                115                 120                 125

Leu Ala Leu Leu Ser Pro Ala Ala Thr Leu Lys Ser Asp Ala Leu Asp
    130                 135                 140

Gly Val Cys Gln Gly Ser Thr Tyr Asp Pro Thr His Ile Pro Glu Thr
145                 150                 155                 160

Val Asn Val Ser Gly Phe Glu Val Gly Gly Ala Tyr Phe Arg Thr Ala
                165                 170                 175

Gln Leu Leu Pro Ile Tyr Gln Thr Ala Glu His Tyr Asn Arg Glu Thr
                180                 185                 190

Leu Leu Ile His Gly Leu Ala Asp Lys Val Val Ser Pro Asn Ala Ser
        195                 200                 205

Arg Lys Phe His Thr Leu Leu Pro Lys Ser Glu Leu His Leu Ile Pro
        210                 215                 220

Asp Glu Gly His Met Phe Asn Gly Lys Asn Arg Pro Glu Val Leu Lys
225                 230                 235                 240

Leu Val Gly Glu Phe Leu Ile Lys
                245
```

COMPOSITION FOR USE IN IMPROVING ENDOTHELIAL FUNCTION BY ENHANCING FLOW MEDIATED DILATION

CROSS REFERENCE TO RELATED APPLICATIONS

The present application is a National Stage of International Application No. PCT/EP2020/060092, filed on Apr. 8, 2020, which claims priority to European Patent Application No. 19168455.4, filed on Apr. 10, 2019, the entire contents of which are being incorporated herein by reference.

FIELD OF THE INVENTION

The present invention relates to a composition comprising esterase treated decaffeinated green coffee extract (HDGCE) for use in a method of improving cardiovascular endpoints such as endothelial function by enhancing flow mediated dilation in a subject, wherein the subject is administered an effective dose of HDGCE with an amount of 100-400 mg/day.

BACKGROUND

Chlorogenic acids are a family of esters formed between trans-cinnamic acids and quinic acid. Chlorogenic acids are naturally present in coffee, mainly as mono and di-esters of quinic acid and phenolic groups (e.g. caffeic, ferulic, coumaric, methoxycinnamic) attached to different positions.

U.S. Pat. No. 8,481,028 describes a method of obtaining hydrolysed chlorogenic acids using microorganisms and/or enzymes capable of hydrolysing caffeoyl quinic acid and diesters (e.g. 3-, 4-, or 5-caffeoyl quinic acid and diesters), and/or feruloyl quinic acid and diesters (e.g. 3-, 4-, or 5-feruloyl quinic acid and diesters), to generate caffeic acid and ferulic acid, respectively.

Endothelium refers to cells that line the interior surface of blood vessels and lymphatic vessels forming an interface between circulating blood or lymph in the lumen and the rest of the vessel wall. The endothelium moderates many blood vessel functions and plays a critical role in the mechanics of blood flow and the regulation of coagulation. In a healthy artery, which also has a healthy endothelium, blood vessels are able to relax if the blood flow increases. It has been observed that subjects having an impaired endothelium function are more susceptible to develop a cardiovascular disease (for instance damage to the endothelium can lead to atherosclerotic plaques, and as well to cerebrovascular diseases). Vascular dysfunction can be monitored by the measurement of flow-mediated dilation (FMD) in blood vessels.

Mills et al. (Clinical Nutrition 36 (2017) 1520-1529) describes the mediation of coffee-induced improvements in human vascular function by chlorogenic acids and its metabolites. In this article, the authors described that pure 5-CQA at 450 mg and 900 mg did not show a significant effect in 24 subjects.

Few studies have been performed with coffee and/or coffee components assessing endothelial dysfunction markers. Interestingly, the majority of these studies have shown a beneficial effect on vascular health. As demonstrated by Mills et al. (Clinical Nutrition 36 (2017) 1520-1529), the effect observed is most prominent with a high chlorogenic acid coffee levels rather than low levels.

A recent study (Sanchez-Bridge et al Biofactors 42 (3) (2016) 259-67) described in detail the absorption and metabolism of coffee chlorogenic and phenolic acids in humans after the administration of coffees with different roasting conditions. In addition, and with the objective to evaluate the importance of the intestinal absorption, an unroasted coffee containing high levels of free phenolic acids after enzymatic hydrolysis was also used as test drink. Enzymatically hydrolyzed unroasted coffee was produced by passing unroasted coffee extract through columns containing beads with immobilized *L. johnsonii* (La1, NCC533) esterase enzyme.

The object of the present invention is to improve the state of the art and to provide a new and better nutritional solution for improving the cardiovascular endpoints such as endothelial function by enhancing flow mediated dilation in a subject.

SUMMARY OF THE INVENTION

Therefore, according to a first aspect of the present invention, although this need not be the broadest nor indeed the only aspect of the invention, there is provided a method of improving vascular function with the consequent improvement on cardio and cerebrovascular diseases comprising administering to a subject an effective dose of an esterase treated decaffeinated green coffee extract (HDGCE) composition, the effective dose of the composition being in an amount of 100-400 mg/day of the hydrolysed green coffee extract.

In one embodiment, the composition comprises a ratio of caffeic acid:ferulic acid of at least greater than 2:1. In another embodiment, the composition comprises a ratio of caffeic acid:ferulic acid to be in range of 3:1 to 10:1.

It has been surprisingly found by the inventors that consumption of a composition comprising HDGCE (173.1 mg HDGCE dose) showed a significant increase of FMD at 1 h (p value=0.036) and 6 h (p value=0.017608) compared with placebo treatment. The increase in FMD at these time points was higher than 1% units of FMD. An improvement of the endothelial dysfunction (1% in flow-mediated dilation value) was associated with a 13% lower risk of cardiovascular events (Inaba et al., 2010, Int J Cardiovas Imaging 26:621-640).

In one aspect, the present invention relates to a composition comprising esterase treated decaffeinated green coffee extract (HDGCE) for use in a method of improving cardiovascular flow and reducing the risk of cardiovascular diseases in healthy subjects as measured by changes in measured flow mediated dilation (FMD) in a subject, wherein the subject is administered an effective dose of the composition in an amount of 100-400 mg/day.

In a still further aspect, the present invention relates to a process for preparing a composition comprising esterase treated decaffeinated coffee extract (HDGCE) comprising the steps of:

Preparing a decaffeinated green coffee extract by contacting green coffee beans with water, steam, organic solvent, super critical $CO_2$ and/or mixtures thereof;

Optionally drying the decaffeinated green coffee extract, preferably spray drying or freeze drying;

Contacting the obtained decaffeinated green coffee extract with esterase enzyme, at pH ranging from 4 to 7 and temperature ranging from 20 to 50° C. for incubation time ranging from 1 to 6 hours, wherein the esterase enzyme is preferably chlorogenate esterase in a concentration preferably ranging from 1 to 20 U/200 mg of green coffee extract W/W, preferably dissolved in 1 ml of water or buffer;

Heating the above enzyme treated green coffee extract at a temperature ranging from 80 to 120° C. for 1 to 30 minutes to deactivate the enzyme and to pasteurize the extract; and Optionally drying the extract to obtain the esterase treated decaffeinated green coffee extract (HDGCE).

DETAILED DESCRIPTION OF THE INVENTION

Figure 1:
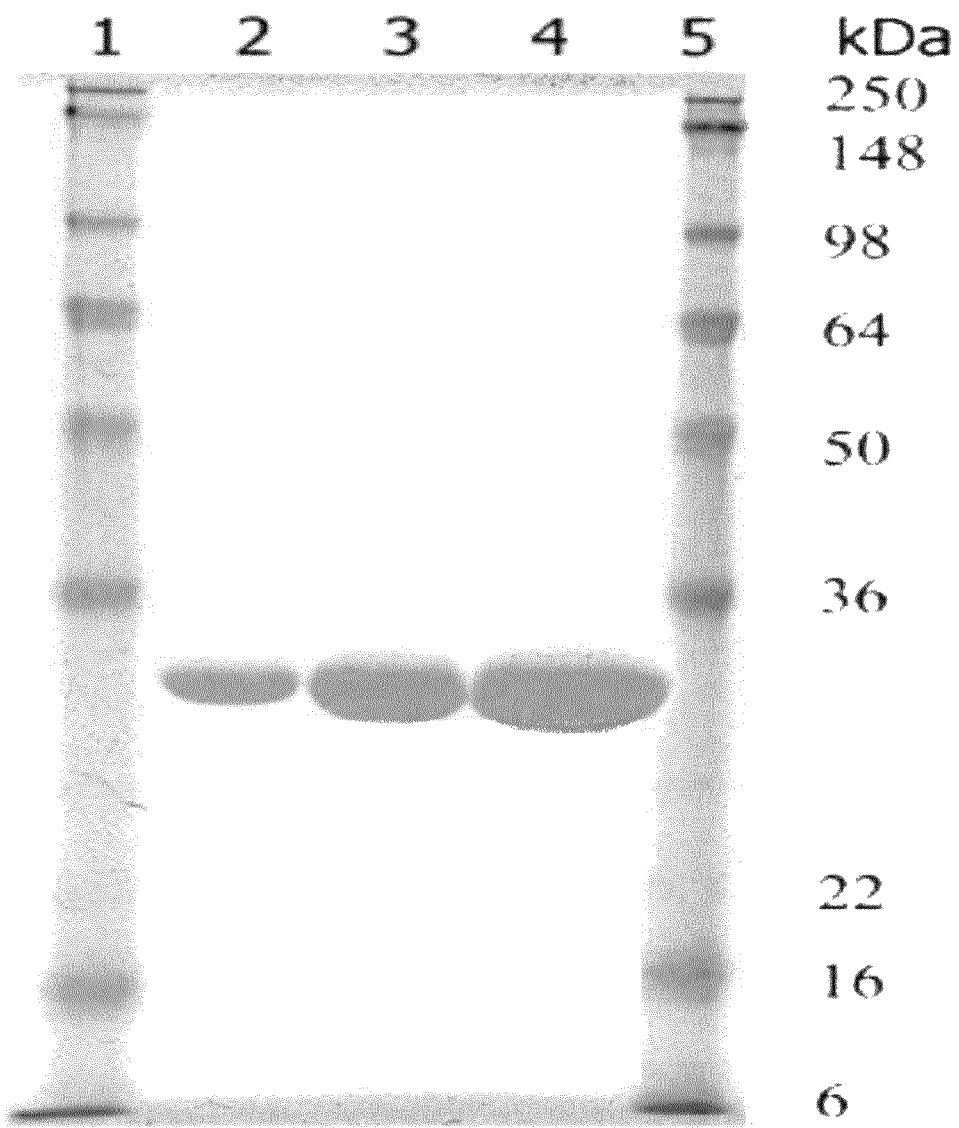
FIG. 1 shows purified esterase from *L. johnsonii* with Mw of around 34 KDa.

The term cardiovascular disease may include, e.g. coronary artery disease (also known as coronary heart disease and ischemic heart disease), peripheral arterial disease (e.g. peripheral endothelial dysfunction), renal artery stenosis, and aortic aneurysm, atherosclerotic plaque formation. There are also many cardiovascular diseases that involve the heart, e.g. cardiomyopathy, hypertensive heart disease, heart failure, pulmonary heart disease, cardiac dysrhythmias, endocarditis. The structures most commonly involved are the heart valves, inflammatory cardiomegaly, myocarditis, certain medications, toxins, and autoimmune disorders, eosinophilic myocarditis, valvular heart disease, congenital heart disease, and rheumatic heart disease. Preferably, the cardiovascular disease is selected from atherosclerotic plaque formation, coronary artery disease, and endothelial dysfunction, preferably endothelial dysfunction. More preferably, the cardiovascular disease is endothelial dysfunction, preferably peripheral endothelial dysfunction.

Cerebrovascular disease includes a variety of medical conditions that affect the blood vessels of the brain and the cerebral circulation. Arteries supplying oxygen and nutrients to the brain are often damaged or deformed in these disorders. The most common presentation of cerebrovascular disease is an ischemic stroke or mini-stroke and sometimes a hemorrhagic stroke. Hypertension (high blood pressure) is the most important contributing risk factor for stroke and cerebrovascular diseases as it can change the structure of blood vessels and result in atherosclerosis. Atherosclerosis narrows blood vessels in the brain, resulting in decreased cerebral perfusion. Other risk factors that contribute to stroke include smoking and diabetes. Narrowed cerebral arteries can lead to ischemic stroke, but continually elevated blood pressure can also cause tearing of vessels, leading to a hemorrhagic stroke. Preferably, the cerebrovascular disease is selected from ischemic stroke, mini stroke, and hemorrhagic stroke.

The term "functional food product" means a beverage or food composition comprising the HDGCE composition in an amount ranging from 100-400 mg of hydrolysed green coffee extract. The food composition may be a powder form such as chocolate or malt based composition. The food composition may also be a snack such as a cereal bar comprising HDGCE.

The term "esterase treated" refers to incubation of the decaffeinated green coffee extract with purified chlorogenate esterase or microorganism containing such an esterase. A chlorogenate esterase for example is described in U.S. Pat. No. 8,481,028 or for example in Bel-Rhlid et al.: Biotransformation of caffeoyl quinic acids from green coffee extracts by *Lactobacillus johnsonii* NCC 533 (2013): AMB express vol 3:28.

An esterase is a hydrolase enzyme that splits esters into an acid and an alcohol in a chemical reaction with water called hydrolysis. The incubation time can be from 30 minutes to 6 hrs at temperatures ranging from 20 to 50° C. related to concentration of the enzyme such that hydrolysis of at least 80% of total chlorogenic acids present in the decaffeinated green coffee extract is reached. In one embodiment the esterase is from *L. johnsonii*.

The term "decaffeinated green coffee extract" refers to green coffee beans decaffeinated by for instance hot water or extraction with organic solvents or supercritical $CO_2$ well known to a skilled person in the art. The caffeine content is lower than 5% W/W, may be 2 to 3% W/W.

The term "amount of 100-400 mg/day" refers to the esterase treated decaffeinated green coffee extract (HDGCE) of 100-400 mg dry weight, which may be dissolved, for instance in water or integrated in to a consumable food product such as cereals, soluble coffee, chocolate or food complement such as capsules or tablets fit for consumption by the subject. In one embodiment the amount of esterase treated decaffeinated green coffee extract of 100-400 mg dry weight is dissolved in about 200 ml water.

The term "measured by changes in flow mediated dilation" refers to the change in delta FMD value between a subject administered with a placebo (subject given a composition without the HDGCE) vs a subject administered with active composition (composition comprising 100-400 mg/day of HDGCE). In one embodiment the change is at least 1% with a p value lower than 0.02.

In one embodiment, the total content of caffeic acid and ferulic acid in said HDGCE composition is between 30 and 80 mg and the composition may be a heat-treated composition. In another embodiment, the total content of caffeic acid and ferulic acid in said HDGCE composition is between 35 and 60 mg and the composition may be a heat-treated composition.

The composition for use according to the invention may be in any suitable format, for example the composition may be in the form of a liquid composition, in the form of a beverage, for example a liquid drink, a shake drink, a nutritional composition or a liquid meal replacement.

An important method of controlling food hygiene risks is to heat treat edible compositions, which may harbour food pathogens or spoilage organisms. Well-known examples of such heat treatments are pasteurization, for example heating an edible material to 70° C. for 2 minutes or 75° C. for 26 seconds or 80° C. for 5 seconds, and ultra-high temperature (UHT) treatment, for example heating an edible material to above 135° C. for at least 2 seconds.

The composition for use according to the invention may be administered in a daily dose to provide HDGCE between 100 mg and 400 mg dry weight per subject per day. This dose should ensure a sufficient daily quantity for providing the desired effect to a subject in at least a mid-term period. In one embodiment, the subject is fasting when the composition is administered.

A further aspect of the present invention is the non-therapeutic use of a composition comprising HDGCE with an amount of 100-400 mg/day to increase flow mediated dilation (FMD), wherein the amount of caffeic acid and ferulic is in the ratio of caffeic:ferulic of at least more than 2:1, for example at least more than 3:1, 4:1, 5:1, 6:1, 7:1, 8:1, 9:1 or 10:1.

In one embodiment, the said subject, in addition to the administration of HDGCE is further complemented with a meal of at least 200 kcal.

In one embodiment, the subject is a human subject. In one embodiment, the subject is a healthy human subject.

Coffee Extract

Numerous methods for producing coffee extracts are known in the art, e.g. from EP 0916267. The coffee extract may e.g. be pure soluble coffee. Pure soluble coffee products are readily available and numerous methods for producing pure soluble coffee products are known in the art, e.g. from EP106930.

Another aspect of the invention provides a process for preparing a HDGCE composition comprising the steps of; (i) Preparing a decaffeinated green coffee extract by contacting green coffee beans with water, steam, organic solvent, super critical $CO_2$ and/or mixtures thereof; (ii) Optionally drying the decaffeinated green coffee extract; (iii) Contacting the obtained decaffeinated green coffee extract with esterase enzyme, at pH ranging from 4 to 7 and temperature ranging from 20 to 50° C. for incubation time ranging from 1 to 6 hours; (iv) Heating the above enzyme treated green coffee extract at a temperature ranging from 80 to 120° C. for 1 to 30 minutes to deactivate the enzyme and to pasteurize the extract; and (v) Optionally drying the extract to obtain the esterase treated decaffeinated green coffee extract (HDGCE). In one embodiment, the drying step (ii) is spray drying or freeze drying. In another embodiment the esterase enzyme is preferably chlorogenate esterase in a concentration preferably ranging from 1 to 20 U/200 mg of green coffee extract W/W preferably dissolved in 1 ml of water or buffer.

Those skilled in the art will understand that they can freely combine all features of the present invention disclosed herein. In particular, features described for the therapeutic use of the composition may be combined with the non-therapeutic use and vice versa. Further, features described for different embodiments of the present invention may be combined. Further advantages and features of the present invention are apparent from the figures and examples.

EXAMPLES

Example 1

Purification, Characterization and Cloning of Esterase from *Lactobacillus johnsonii* (NCC 533)

The esterase activity was identified in *Lactobacillus johnsonii* whole cells. The enzyme was purified and characterized. The gene was annotated (LJ-1228, Gene=1158601 1159347 Reversed Product=alpha/beta hydrolase see sequences below). The gene was then over-expressed in a food-grade *E. coli* and enzyme purified by HPLC (HIC column TSK gel Phenyl-5 PW, Linear gradient of 1 to 0 mol $(NH_4)_2SO_4/L$ in $NaPO_4$ (50 mM) pH 7.0+1 mM EDTA. Flow 0.8 ml/min).

```
DNA Sequence/Nucleotides Sequence
Atggagactacaattaaacgtgatggtctaaacttacatggtttacttgaaggaaccgataagattgaaaatgatacgattgctattttaatgcat ggttttaaaggtgatttgggttatgatgacagcaagattttgtatgctctctctcactacttaaatgatcaaggcctcccaacaattcgttttgactttt gatggatgcggaaaaagtgatggtaaatttgaagatatgactgtctatagcgaaatcctagatgggataaaaatattagattatgttcgtaatac tgttaaggcaaaacatatctatttagtgggacactcccaaggtggagtagtagcgtcaatgctggctggatattatcgagatgttattgaaaaat tggctttactctctcctgcagcaactcttaagtctgatgcttagatggagtttgtcagggtagtacttatgatccaacgcatatccctgaaactgt caatgttagtggctttgaagtaggaggagcttactttagaacggctcaattattgcctatttatcaaacagcggaacattataatagggaaacttt attgattcatggcttagcagataaagtcgtgtcacctaatgcttcaagaaaatttcatacacttttgcctaaaagtgagctccatttaattccagat gagggtcacatgtttaacggaaaaaatagacctgaagtattaaaattagttggtgagttttaataaaataa Amino Acid Sequence
    1           mettikrdgl  nlhgllegtd  kiendtiail  mhgfkgdldy  ddskilyals  hylndqglpt 61           irfdfdgcgk  sdgkfedmtv  yseildgiki  ldyvrntvka  khiylvghsq  ggvvasmlag 121           yyrdviekla  llspaatlks  daldgvcqgs  tydpthipet  vnvsgfevgg  ayfrtaqllp 181           iyqtaehynr  etllihglad  kvvspnasrk  fhtllpksel  hlipdeghmf  ngknrpevlk 241           lvgeflik
```

Identification of Optimal pH of *L. johnsonii* Esterase

Figure 2:
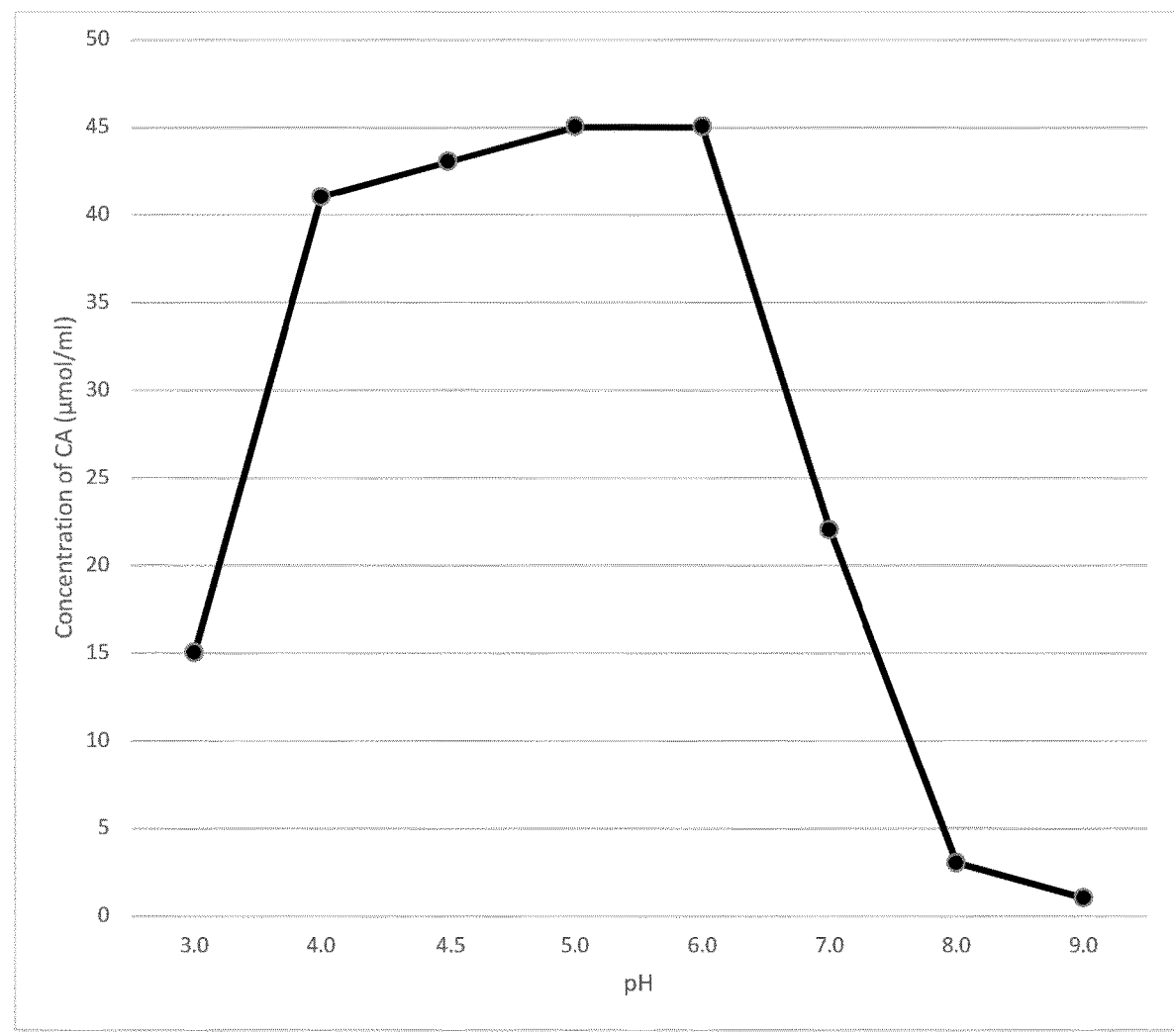
FIG. 2 shows effect of pH on the *L. johnsonii* esterase activity.

The optimum pH was determined by using glycine buffer, acetate buffer, Tris buffer, phosphate buffer and water. 5-CQA was used as substrate (50 µmol/ml). As we can see in FIG. 2, the optimum pH of the enzyme was between 4.0 and 6.0. The reactions were performed for 30 min at 37° C. with purified esterase (0.01 U/mg substrate)

Identification of Optimal Temperature of *L. johnsonii* Esterase

Figure 3:
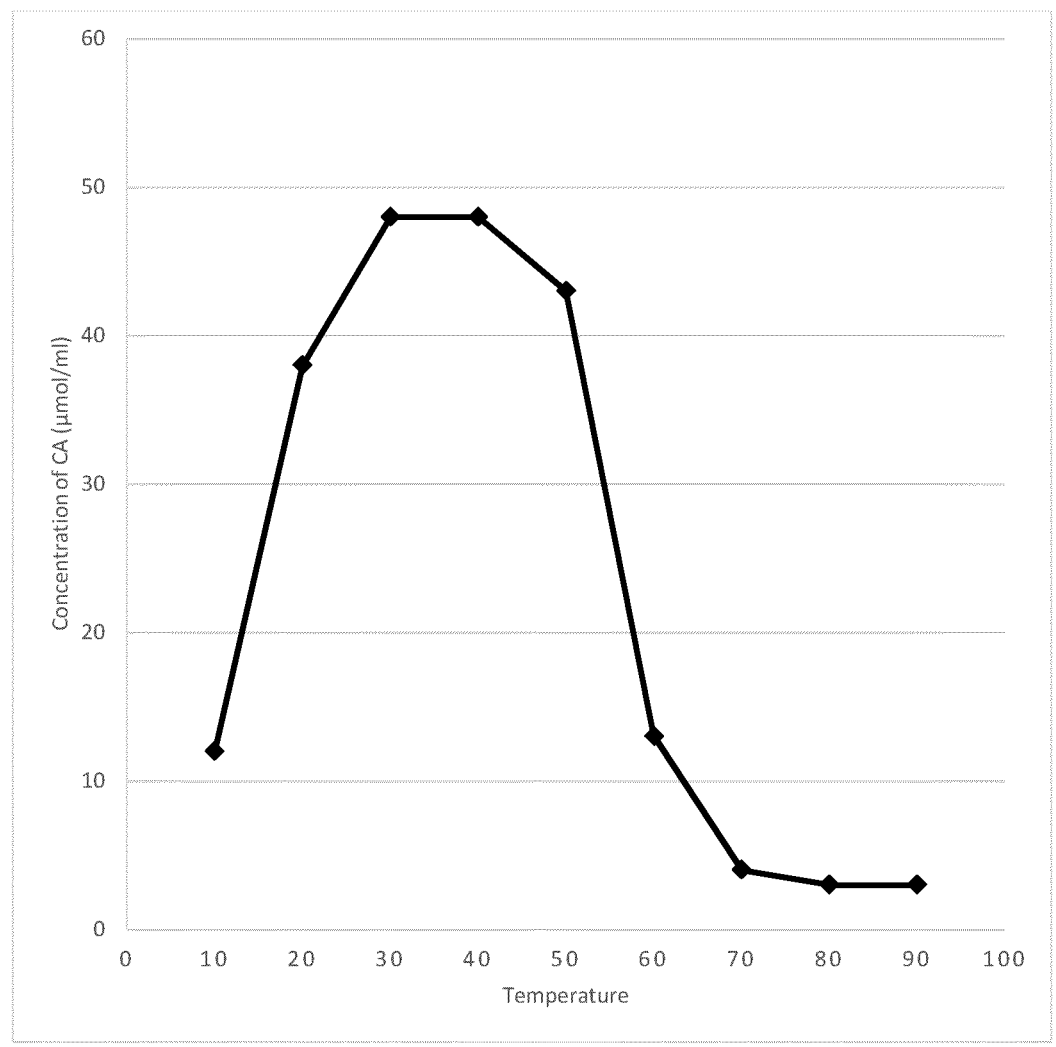
FIG. 3 shows effect of temperature on the *L. johnsonii* esterase activity.

The optimum temperature was determined by using 5-CQA as substrate (50 µmol/ml) at different temperatures from 10° C. to 90° C. As we can see in FIG. 3, the optimum temperature of the enzyme was between 30° C. and 40° C. The reactions were performed for 30 min at pH 5.0 with purified esterase (0.01 U/mg substrate)

Substrate Specificity

Figure 4:
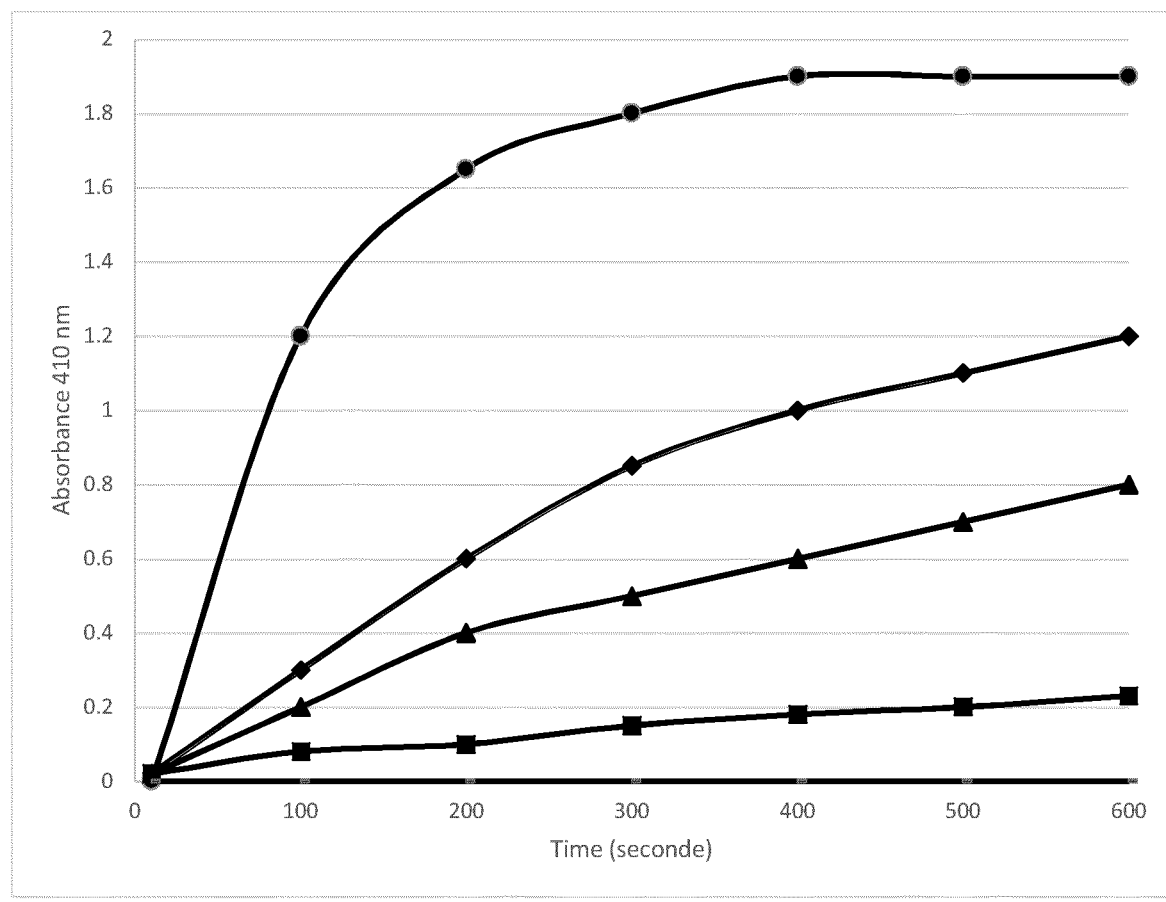
FIG. 4 shows substrate specificity of *L. johnsonii* esterase. 4-nitrophenyl butyrate (•); 4-nitrophenyl acetate (♦); 4-nitrophenyl decanoate (▲); 4-nitrophenyl tetradecanoate (■); 4-nitrophenyl dodecanoate (▬).

The substrate specificity of *L. johnsonii* esterase was studied using different 4-nitrophenyl derivatives. As we can see in FIG. 4, 4-nitrophenyl butyrate was the best substrate while no transformation of 4-nitrophenyl dodecanoate could be observed. The reactions were carried out in sodium phosphate buffer pH 6.0 at 37° C. for 10 min. The substrates were used at concentration of 0.2 mM and enzyme at 0.01 U/mg substrate. The measures were monitored each 30 seconds. The absorbance was set at 410 nm.

Treatment of Decaffeinated Green Coffee Extract with *L. Johnsonii* Esterase.

Reaction Kinetics: Lab Scale Trials

Kinetic studies were performed on decaffeinated green coffee extract (DGCE) at 200 mg/ml using *L. johnsonii* esterase at different concentrations (1.65, 3.3, 4.95, 8.25 and 16.25 U/ml). The reactions were performed in 1 ml volume, at pH 4.5 and 37° C. The results are summarized in the charts below. The concentrations of the different compounds are in mg/ml.

| Time (h)       | 0     | 1     | 2     | 3     | 4     |
|----------------|-------|-------|-------|-------|-------|
| Enzyme (U)     | 0     | 1.65  | 1.65  | 1.65  | 1.65  |
| DGCE (mg/ml)   | 200   | 200   | 200   | 200   | 200   |
| CQAs           | 52.11 | 21.51 | 18.05 | 16.18 | 15.14 |
| FQAs           | 11.03 | 9.89  | 9.09  | 9.56  | 8.3   |
| di-CQAs        | 13.22 | 3.34  | 2.88  | 2.65  | 2.44  |
| CA             | 0.49  | 19.82 | 21.51 | 22.35 | 22.08 |
| FA             | 0.21  | 3.76  | 4.11  | 4.45  | 4.36  |
| Caffeine       | 3.20  | 3.13  | 3.09  | 3.10  | 3.00  |
| Enzyme (U)     | 0     | 3.3   | 3.3   | 3.3   | 3.3   |
| DGCE (mg/ml)   | 200   | 200   | 200   | 200   | 200   |
| CQAs           | 52.25 | 17.77 | 14.62 | 12.88 | 11.09 |
| FQAs           | 11.1  | 1.65  | 1.46  | 1.28  | 1.11  |
| di-CQAs        | 13.29 | 2.41  | 2.14  | 2.08  | 1.83  |
| CA             | 0.48  | 25.63 | 27.23 | 27.56 | 26.27 |
| FA             | 0.20  | 4.09  | 4.58  | 4.77  | 4.80  |
| Caffeine       | 3.21  | 3.05  | 3.08  | 3.04  | 2.90  |
| Enzyme (U)     | 0     | 4.95  | 4.95  | 4.95  | 4.95  |
| DGCE (mg/ml)   | 200   | 200   | 200   | 200   | 200   |
| CQAs           | 50.85 | 15.88 | 12.86 | 10.93 | 10.04 |
| FQAs           | 10.74 | 1.66  | 1.29  | 1.07  | 0.57  |
| di-CQAs        | 11.75 | 1.83  | 1.72  | 1.44  | 1.37  |
| CA             | 0.49  | 26.42 | 27.77 | 27.82 | 27.65 |
| FA             | 0.21  | 4.30  | 4.79  | 4.94  | 5.19  |
| Caffeine       | 3.12  | 3.03  | 3.04  | 2.94  | 2.98  |
| Enzyme (U)     | 0     | 8.25  | 8.25  | 8.25  | 8.25  |
| DGCE (mg/ml)   | 200   | 200   | 200   | 200   | 200   |
| CQAs           | 51.68 | 13.03 | 9.78  | 8.07  | 6.93  |
| FQAs           | 10.92 | 1.32  | 0.56  | 0.50  | 0.49  |
| di-CQAs        | 13.48 | 1.53  | 1.17  | 0.95  | 0.90  |
| CA             | 0.48  | 27.13 | 28.52 | 29.22 | 29.40 |
| FA             | 0.21  | 4.90  | 5.72  | 6.08  | 6.36  |
| Caffeine       | 3.20  | 2.97  | 2.95  | 2.94  | 2.92  |
| Enzyme (U)     | 0     | 16.5  | 16.5  | 16.5  | 16.5  |
| DGCE (mg/ml)   | 200   | 200   | 200   | 200   | 200   |
| CQAs           | 51.46 | 8.90  | 6.34  | 4.87  | 3.91  |
| FQAs           | 10.93 | 0.54  | 0.48  | 0.44  | 0.42  |
| di-CQAs        | 13.19 | 1.29  | 1.02  | 0.58  | 0.30  |
| CA             | 0.48  | 27.26 | 28.79 | 29.19 | 29.90 |
| FA             | 0.21  | 4.90  | 5.72  | 6.08  | 6.36  |
| Caffeine       | 3.18  | 2.80  | 2.83  | 2.79  | 2.82  |

Reaction Kinetics as Function of Time

Kinetic studies were performed on decaffeinated green coffee extract (200 mg/ml) using *L. johnsonii* esterase at concentration of 16.25 U/ml. The reactions were performed in 1 ml reaction volume, at pH 4.5 and 37° C. The kinetics were carried out for 1, 2, 3 and 4 hours. The concentration of the different compounds are in mg/ml.

Reaction Kinetics as Function of Enzyme Concentration

Figure 5:
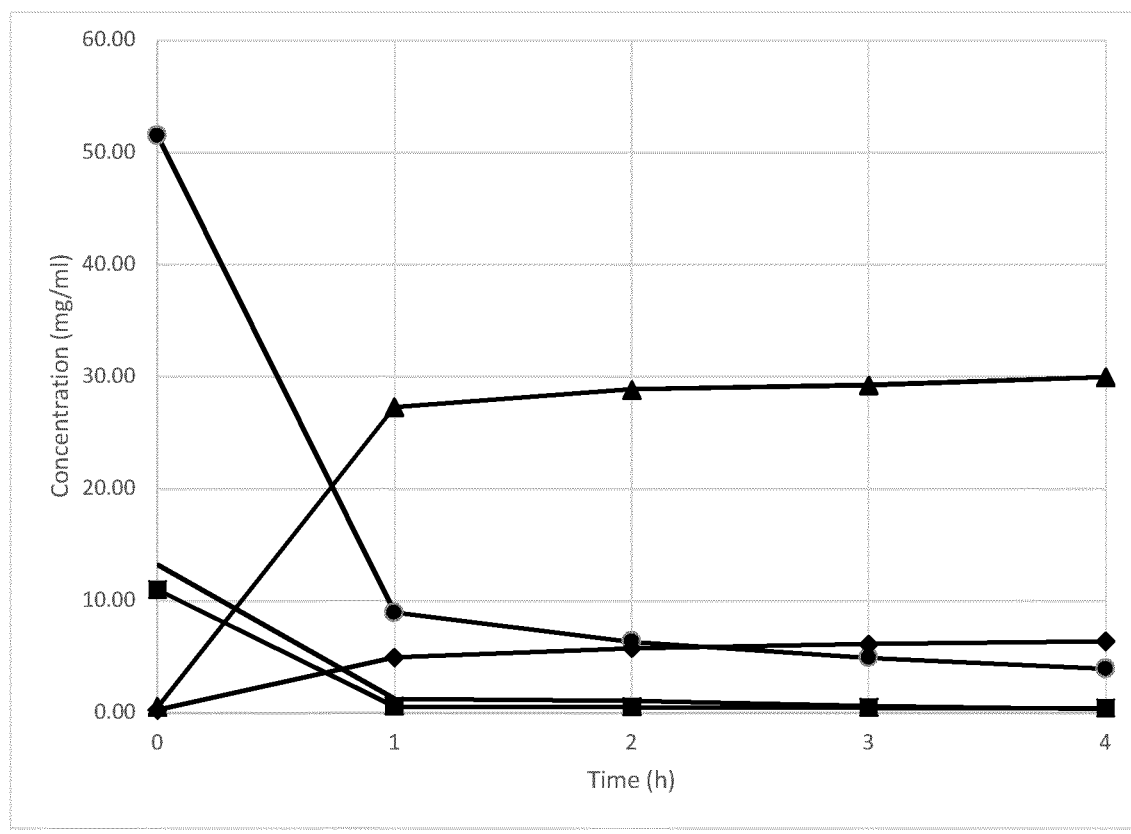
FIG. 5 shows Kinetic transformation of CQAs (•); FQAs (■) and di-CQAs (▬) from decaffeinated green coffee extract (200 g/L) by *L. johnsonii* esterase (16.5 U/ml) and formation of caffeic acid (▲) and ferulic acid (♦) as function of time. Reaction volume was 1 ml. The reactions were performed in duplicate.
Figure 6:
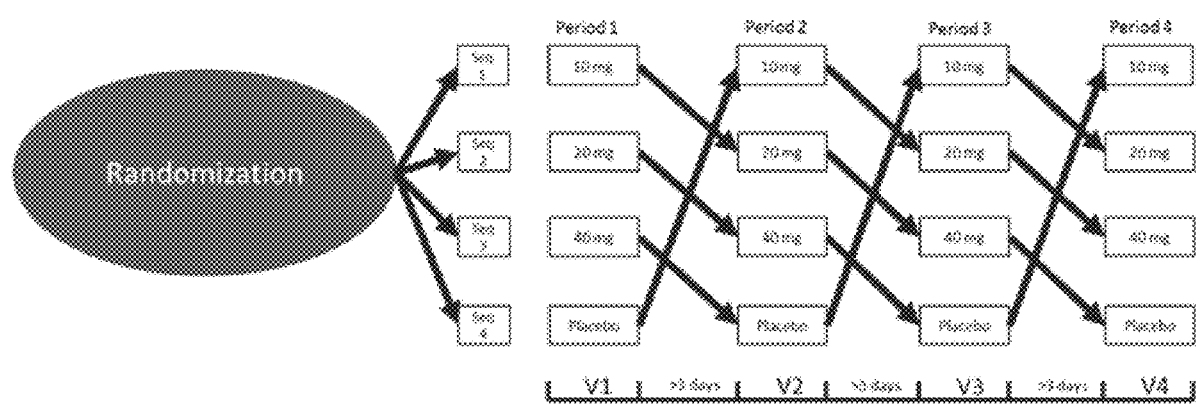
FIG. 6 shows the trial design of the experimental example disclosed herein.

Kinetic studies were performed on decaffeinated green coffee extract (200 mg/ml) using *L. johnsonii* esterase at different concentrations (5, 10, 15, 25 and 50 µl/ml that correspond respectively to 1.65, 3.3, 4.95, 8.25 and 16.5 U/ml). The reactions were performed in 1 ml volume, at pH 4.5 and 37° C. (see FIG. 5). The reactions time was 4 hours. The concentration of the different compounds are in mg/ml.

Pilot Plant Trial

Treatment of Decaffeinated Green Coffee Extract with *L. johnsonii* Esterase

Decaffeinated green coffee extract (1.76 Kg) was dissolved in water (8.8 Kg) under stirring. The pH was then adjusted to pH 4.5 by addition of chlorohydric acid (HCl, 0.36 Kg). To this solution, 0.024 Kg of enzyme (Esterase from *L. johnsonii*) was added in two times: 0.016 Kg of enzyme was added at time T=0 h and 0.008 Kg of enzyme was added after 3 h of reaction. The reaction was performed at 37° C. for 6 hours. The mixture was then heated for 10 min at 98° C. to inactive the enzyme. After centrifugation (2 min at 5000 g) and filtration (0.45 µm), the mixture was freeze-dried and the resulting powder was used for the preparation of beverages used for clinical study.

UPLC Analysis

The method used to analyze the samples allows the quantitative determination of caffeic acid, chlorogenic acid isomers (5-CQA, 4-CQA, 3-CQA, 4-FQA, 5-FQA, 3,4-diCQA, 3,5-diCQA and 4,5-diCQA) and caffeine in liquid coffee extract and pure soluble coffee, extracted either from roasted or green beans. The samples were centrifuged (5000 g) for 5 min at 15° C. 100 µL of the resulting supernatant were added to 900 µL of methanol/water (80:20) and filtered on 0.2 µm before analysis. The analyses were performed on an UPLC equipped with a pump, a degassing system, a sample injector with injection loop more than 5 µL, an photodiode array detector (325 and 275 nm wavelength) and an appropriate data software. The separation of molecules was carried on an ACQUITY UPLC BEH Shield RP 18, 1.7 µm, 2.1×100 mm, column (from Waters). Mobile phase A was 5% acetonitrile in water with 0.1% phosphoric acid and mobile phase B was 100% acetonitrile with 0.1% phosphoric acid. Flow rate was 0.4 mL/min, column temperature 35° C. and injection volume was 2 µL.

Clinical Trial

Primary Objective

The primary objective of the trial was to investigate the efficacy by oral administration of hydrolyzed decaffeinated green coffee rich in phenolic acids in improving endothelial function in healthy volunteers. Endothelial function is defined as the percent change in the internal diameter of the brachial artery during reactive hyperemia relative to baseline (% FMD).

Primary Endpoint

The primary outcome was the average change from baseline (i.e. predose) in % FMD at any time point post treatment. Responses were calculated as the percentage change in brachial artery diameter from baseline Trial Design for HDGCE This was a placebo-controlled, double-blind, randomized, single-center, cross-over trial of hydrolyzed green coffee extract in 20 healthy subjects. Subjects were randomly assigned to each group sequence. The trial was performed in one center, and involved 4 days (non-consecutive) treatment period.

Statistical Analyses

The main analysis of the primary endpoint was the difference in change from baseline means of FMD at peak between the different doses of phenolic acid and the control at each time point after the baseline. A difference of 1% was considered clinically relevant and a p-value of less than 0.05 was considered statistically significant.

Description of the Composition

A hydrolyzed green coffee extract containing phenolic acids and at approximately 2% caffeine was used for the trial. In this study, only one dose per day of coffee extract rich in phenolic acids was given to subjects. The decaffeinated green coffee extract, maltodextrin and aroma were wet-mixed and then freeze-dried to ensure homogeneity of the final premix.

The placebo contains only maltodextrin and aroma. The amount of maltodextrin and aroma are similar between the 4 arms to avoid any potential effect of these ingredients on the study outcomes. The table below describes the composition of the four investigational products after freeze-drying (considering 2% residual water following drying).

TABLE 1

Hydrolyzed green coffee extract (HDGCE) compositions

|  | Placebo | Dose 10 (10 mg of caffeic acid (CA) and ferulic acids (FA)) | Dose 20 (20 mg of CA + FA) | Dose 40 (40 mg of CA + FA) |
|---|---|---|---|---|
| Hydrolyzed green coffee extract (mg) | 0.0 | 43.3 | 86.6 | 173.1 |
| Maltodextrin DE 21 (mg) | 902.5 | 902.5 | 902.5 | 902.5 |
| Strawberry aroma (mg) | 47.5 | 47.5 | 47.5 | 47.5 |
| Est. residual water (mg) | 19.0 | 19.9 | 20.7 | 22.5 |
| Total mass (mg) | 969.0 | 1013.2 | 1057.3 | 1145.6 |
| Est. Energy content (kcal/100 g) | 379 | 373 | 370 | 366 |

Each dose of investigational product or matching placebo was dissolved in an opaque glass of 200 mL of mineral water at room temperature with lid right before the administration. The investigational product was administered in the morning in fasting conditions.

Disposition of Subjects 23 subjects were screened and 3 of them were screening failures with violation of inclusion and/or exclusion criteria. All the rest of 20 subjects enrolled to the study continued all 4 visits.

Full Analysis Dataset (Referred to as FAS or ITT for Intention to Treat)

All subjects that were randomized were included in the full analysis. There were a total number of 20 subjects for this dataset. Of which only 42 subjects have data available for the primary analysis.

TABLE 1

Analysis populations

| Population | Total subjects | Subjects with complete baseline FMD data |
|---|---|---|
| FAS/ITT | 20 | 19 |
| PP | 14 | 14 |

TABLE 3

Summary Statistics Change from Baseline FMD

| DOSE | time-point | N | mean | sd | median | q1 | q3 | min | max |
|---|---|---|---|---|---|---|---|---|---|
| Placebo | T0 | 20 | 0.00 | 0.00 | 0.00 | 0.00 | 0.00 | 0.00 | 0.00 |
|  | T1 | 20 | −0.07 | 2.14 | −0.55 | −1.66 | 1.18 | −2.51 | 6.34 |
|  | T2 | 19 | 0.42 | 2.38 | −0.07 | −1.37 | 1.95 | −2.78 | 6.51 |
|  | T3 | 20 | 0.67 | 2.23 | 0.48 | −1.23 | 2.06 | −2.78 | 4.62 |
|  | T4 | 20 | 0.22 | 1.78 | 0.09 | −1.35 | 1.48 | −1.96 | 4.35 |
|  | T6 | 20 | 0.37 | 1.85 | 0.24 | −0.89 | 0.98 | −2.82 | 4.21 |
| Dose 10 | T0 | 19 | 0.00 | 0.00 | 0.00 | 0.00 | 0.00 | 0.00 | 0.00 |
|  | T1 | 19 | 0.59 | 1.39 | 0.17 | −0.50 | 1.91 | −2.15 | 2.65 |
|  | T2 | 19 | 0.55 | 1.37 | 0.53 | −0.23 | 1.26 | −1.41 | 4.30 |
|  | T3 | 19 | 0.72 | 2.23 | 0.77 | −0.37 | 1.86 | −3.57 | 4.94 |
|  | T4 | 19 | 0.73 | 1.69 | 0.87 | −0.76 | 1.95 | −2.36 | 3.85 |
|  | T6 | 19 | 0.73 | 1.63 | 0.67 | −0.19 | 1.94 | −1.99 | 4.41 |
| Dose 20 | T0 | 20 | 0.00 | 0.00 | 0.00 | 0.00 | 0.00 | 0.00 | 0.00 |
|  | T1 | 20 | −0.09 | 1.20 | −0.19 | −0.77 | 1.08 | −2.66 | 1.68 |
|  | T2 | 20 | 0.98 | 1.85 | 1.05 | 0.04 | 2.25 | −3.16 | 4.21 |
|  | T3 | 19 | 0.91 | 1.68 | 1.29 | −0.62 | 2.01 | −2.20 | 3.65 |
|  | T4 | 20 | 0.66 | 1.25 | 0.51 | −0.15 | 1.41 | −1.32 | 3.07 |
|  | T6 | 20 | 0.08 | 1.34 | −0.02 | −0.90 | 0.97 | −2.35 | 2.31 |
| Dose 40 | T0 | 20 | 0.00 | 0.00 | 0.00 | 0.00 | 0.00 | 0.00 | 0.00 |
|  | T1 | 20 | 0.90 | 1.90 | 0.82 | −0.64 | 1.84 | −2.03 | 4.71 |
|  | T2 | 20 | 0.66 | 1.90 | 0.57 | −0.43 | 1.35 | −2.50 | 4.68 |
|  | T3 | 20 | 0.68 | 2.48 | 0.47 | −0.82 | 1.27 | −3.33 | 6.36 |
|  | T4 | 19 | 0.39 | 2.22 | 0.07 | −0.87 | 2.33 | −3.76 | 3.88 |
|  | T6 | 20 | 1.48 | 1.63 | 1.50 | 0.58 | 2.59 | −2.82 | 3.67 |

Results on Endothelial Dysfunction

TABLE 4

Dose 40 vs Placebo Estimated differences and significance

| Measurement |  | Time [hours] | Estimate [%] | difference | pvalue |
|---|---|---|---|---|---|
| FMD PEAK | AT |  |  |  |  |
|  |  | 1 | 1.0129864 |  | 0.036782 |
|  |  | 2 | 0.3108739 |  | 0.52569 |
|  |  | 3 | 0.0571364 |  | 0.905784 |
|  |  | 4 | 0.200163 |  | 0.682904 |
|  |  | 6 | 1.1531864 |  | 0.017608 |

TABLE 5

Dose 20 vs Placebo Estimated differences and significance

| LBTEST |  | Time [hours] | Estimate [%] | difference | pvalue |
|---|---|---|---|---|---|
| FMD PEAK | AT |  |  |  |  |
|  |  | 1 | 0.1022950 |  | 0.8152772 |
|  |  | 2 | 0.7160753 |  | 0.1079982 |
|  |  | 3 | 0.3527904 |  | 0.4270130 |
|  |  | 4 | 0.5687950 |  | 0.1947502 |
|  |  | 6 | −0.1622050 |  | 0.7110748 |

TABLE 6

Dose 10 vs Placebo Estimated differences and significance

| LBTEST | Time [hours] | Estimate [%] difference | pvalue |
|---|---|---|---|
| FMD AT | | | |
| PEAK | 1 | 0.7006669 | 0.1497409 |
| | 2 | 0.2239250 | 0.6491587 |
| | 3 | 0.1003932 | 0.8361086 |
| | 4 | 0.5573011 | 0.2514995 |
| | 6 | 0.4092880 | 0.3993708 |

TABLE 7

FMD iAUC summary statistics for HDGCE

| DOSE | N | mean | sd | median | q1 | q3 | min | max | Pvalue |
|---|---|---|---|---|---|---|---|---|---|
| Placebo | 20 | 1.72 | 8.22 | 0.60 | −4.10 | 7.23 | −10.82 | 22.39 | — |
| Dose 10 | 19 | 3.69 | 6.03 | 4.36 | 2.03 | 7.69 | −10.45 | 12.83 | 0.2966 |
| Dose 20 | 20 | 2.85 | 4.99 | 2.19 | −0.07 | 6.09 | −6.78 | 14.13 | 0.5711 |
| Dose 40 | 20 | 4.21 | 8.62 | 4.56 | −0.61 | 8.57 | −11.58 | 23.85 | 0.2147 |

The p-values pertain to comparison of iAUCs of the different doses to the iAUC of Placebo. None of the doses were found to be statistically different from the Placebo and this is likely due to the very high variability observed.

We found out that the 173.1 mg HDGCE dose showed a significant increase of FMD at 1 h (p value=0.036) and 6 h (p value=0.017608) compared with placebo treatment. The increased in FMD at these time points was higher than 1% units of FMD. An improvement of the endothelial dysfunction (1% in flow-mediated dilation value) was associated with a 13% lower risk of cardiovascular events (Inaba et al. (2010) Int J Cardiovas Imaging 26:621-640).

CONCLUSIONS

Statistical significance was observed between 173.1 mg of HDGCE (dose 40) and Placebo at timepoints 1 hour and 6 hours.

---

The invention claimed is:

1. A method for improving cardiovascular flow and reducing the risk of cardiovascular diseases in healthy subjects as measured by changes in measured flow mediated dilation (FMD) in a subject, wherein the subject is administered an effective dose of a composition comprising esterase treated decaffeinated green coffee extract (HDGCE) in an amount of 100-400 mg/day.

2. The method according to claim 1, wherein the composition is in the form of a functional food product.

3. The method according to claim 1, wherein the composition comprises a weight ratio of caffeic acid:ferulic acid of at least 2:1.

4. The method according to claim 3, wherein the composition has a weight ratio of caffeic acid:ferulic acid ranging from 3:1 to 10:1.

5. The method according to claim 1, wherein the composition has a total content of caffeic acid and ferulic acid between 30 and 80 mg and the composition is a heat-treated composition.

6. The method according to claim 1, wherein the composition has a total content of caffeic acid and ferulic acid of between 35 and 60 mg and the composition is a heat-treated composition.

7. The method according to claim 1, wherein the composition is a liquid beverage composition.

8. The method according to claim 1, wherein the subject, in addition to the administration of HDGCE is further complemented with a meal of at least 200 kcal.

9. The method according to claim 1, wherein the subject is human.

10. The method according to claim 1, wherein the cardiovascular disease is endothelial dysfunction.

11. The method according to claim 1, wherein the composition is in the form of a powder.

12. The method according to claim 1, wherein the composition is in the form of a snack.

* * * * *